No. 789,033. PATENTED MAY 2, 1905.
H. B. JONES.
GRAIN AND FEED GRINDER.
APPLICATION FILED AUG. 11, 1904.
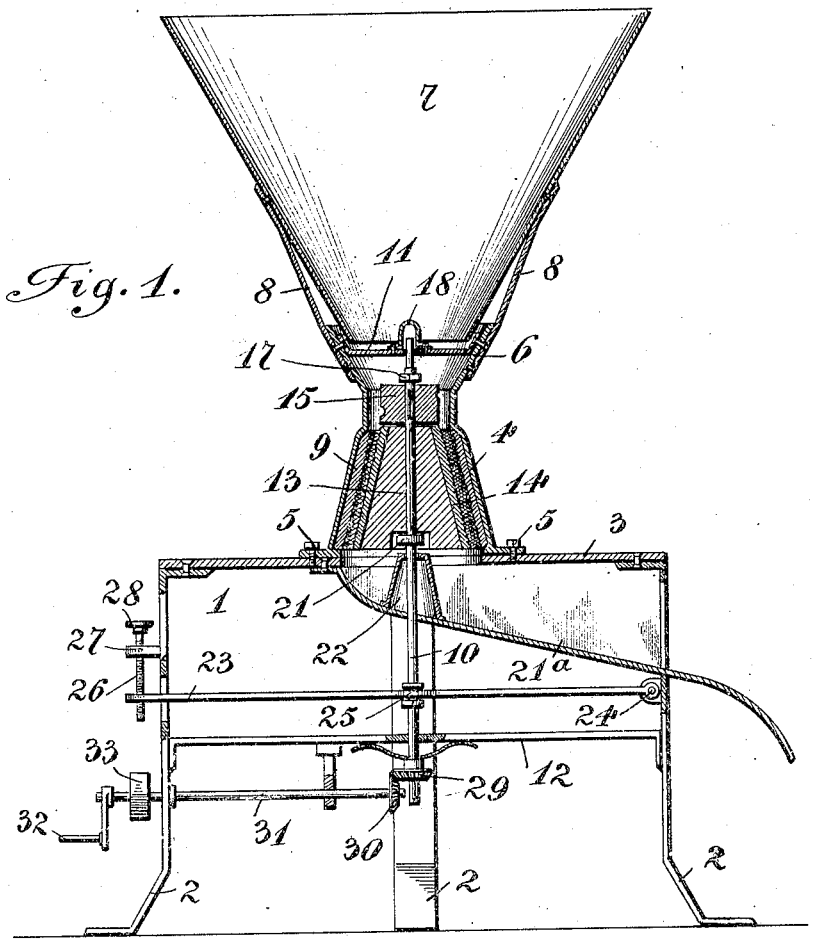
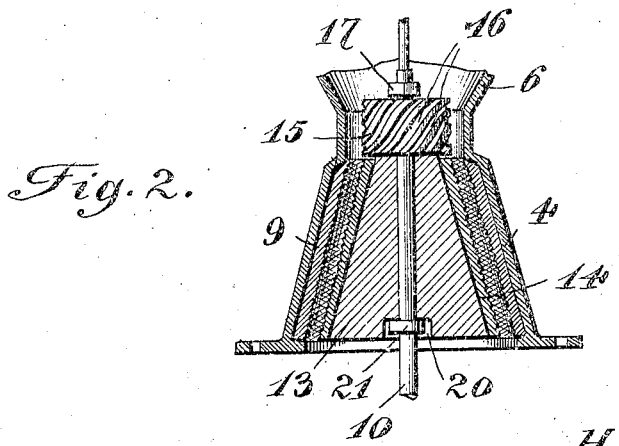
Witnesses
C. Munter
C. H. Gresbauer
Inventor
H. B. Jones
by H. R. Wilson
Attorney No. 789,033.

Patented May 2, 1905.

UNITED STATES PATENT OFFICE.

HARRY B. JONES, OF REARDAN, WASHINGTON.

GRAIN AND FEED GRINDER.

SPECIFICATION forming part of Letters Patent No. 789,033, dated May 2, 1905.

Application filed August 11, 1904. Serial No. 220,414.

*To all whom it may concern:*

Be it known that I, HARRY B. JONES, a citizen of the United States, residing at Reardan, in the county of Lincoln and State of Washington, have invented certain new and useful Improvements in Grain and Feed Grinders; and I do declare the following to be a full, clear, and exact description of the invention, such as will enable others skilled in the art to which it appertains to make and use the same.

My invention relates to feed and grain grinders; and the objects of the same are to provide a simple inexpensive structure for grinding all kinds of grain and feed and which will be provided with improved means for feeding the material to be ground from the hopper to the grinding-cones and which shall be provided with means for connection to a motor or other power or which may be driven by hand. These and other objects are attained by means of the construction illustrated in the accompanying drawings, in which—

Figure 1 is a vertical section taken centrally through a machine made in accordance with my invention. Fig. 2 is a detail section of the grinding-cones.

The numeral 1 designates a suitable stand or support having legs 2 and a base or table portion 3. Supported centrally upon the table 3 is a hollow shell 4, secured by bolts 5 to the table and having a flaring upper end 6, which forms a feed-opening to the grinding-cones.

7 is a feed-hopper into which the material is to be placed, and 8 are the supports for said hopper lying over the flaring portion 6 and engaging the hopper 7 at a suitable point above. Within the shell 4 is a stationary grinding-cone 9. A shaft 10, journaled in a cross-bar 11 at the top and in a cross-bar 12 below, has secured to it the solid conical support 13 for the hollow movable grinding-cone 14, which is seated upon and conforms substantially to the contour of said solid cone 13. Above the cone 13 is a feeder 15, also mounted upon the shaft 10 immediately above the cone 13, said feeder 15 being provided with a series of spiral grooves 16, designed to feed the material gradually and distribute it equally around the cone 13 in order that all portions of the cone shall be subjected to substantially the same amount of work and to equalize the strain upon said cone. To hold the feeder 15 and the revolving cone in place, a nut 17 is placed upon the upper end of the shaft 10, and this nut is covered by a cap 18, secured upon a cross-bar 11, extending from one side to the other of the flaring portion 6. The solid cone-support 13 is recessed centrally, as at 20, and provided with a stop or nut 21, upon which the cone-support 13 rests.

A discharge-chute $21^a$ extends out from one side of the framework, and in order to keep the ground material from coming in contact with the shaft 10, which passes through the chute $21^a$, a shield or guard 22 surrounds the shaft 10 and is seated upon the chute $21^a$. To adjust the revolving cone relatively to the outer or stationary cone, the shaft 10 may pass through a cross-bar 23, hinged at 24 to the frame and connected at 25 to the shaft 10. At the opposite end of the cross-bar 23 from the hinged connection 24 an adjusting-screw 26 is provided, said screw passing through the cross-bar 23 and being supported above in a bracket 27.

28 is a hand-wheel on the end of the adjusting-screw 26, which is employed for the purpose of raising the end of the cross-bar 23, and thus adjusting the inner cone vertically within the outer shell to regulate the fineness or coarseness of the material to be ground. The inner cone may be driven by means of a bevel-gear 29 on the shaft 10, said bevel-gear being in mesh with a gear 30 on a shaft 31, extending outward and journaled in the frame. The shaft 31 may be provided with a hand-crank 32 and a pulley 33. If it is desired to operate the machine by power, a belt passing from the pulley 33 may extend through the driving-shaft to the motor, or the crank 32 may be used for operating the machine by hand.

From the foregoing it will be obvious that my grinder is of comparatively simple construction, can be easily taken apart and reassembled when repairs are necessary, and that as a whole the device is simple in construction and efficient for its use.

Having thus described my invention, what

I claim as new, and desire to secure by Letters Patent, is—

In a feed-grinder, a hollow shell provided with a hollow stationary cone, a solid cone-support secured to a shaft, a hollow cone surrounding said support with its major diameter downward, and a superposed solid cylindrical feeder comprising a sleeve of equal diameter from end to end having a series of spirally-disposed feeding-grooves extending from top to bottom of said feeder, substantially as described.

In testimony whereof I have hereunto set my hand in presence of two subscribing witnesses.

HARRY B. JONES.

Witnesses:
J. E. FRASER,
E. N. INNES.